United States Patent [19]

Kurihara et al.

[11] Patent Number: 4,841,517
[45] Date of Patent: Jun. 20, 1989

[54] DISK CLAMPING DEVICE

[75] Inventors: Toshihiko Kurihara; Tadashi Funabashi, both of Saitama, Japan

[73] Assignee: Pioneer Electronic Corporation, Tokyo, Japan

[21] Appl. No.: 179,824

[22] Filed: Apr. 11, 1988

[30] Foreign Application Priority Data

Apr. 16, 1987 [JP] Japan .................................. 62-92031

[51] Int. Cl.$^4$ .............................................. G11B 25/04
[52] U.S. Cl. .................................. 369/270; 360/99.12
[58] Field of Search ............................. 369/270, 271; 360/99.12

[56] References Cited

U.S. PATENT DOCUMENTS 4,541,086 9/1985 Tanaka ................................. 369/270

FOREIGN PATENT DOCUMENTS 100283 6/1983 Japan .................................. 369/270
75966 4/1987 Japan .................................. 369/270

Primary Examiner—Steven L. Stephan
Attorney, Agent, or Firm—Sughrue, Mion, Zinn, Macpeak & Seas

[57] ABSTRACT

A disk clamping device for clamping either one of a disk having a small center hole, such as a compact disk, and a disk having a larger center hole, such as a video disk, to a turntable with which the diameter of the turntable can be increased to reduce the amount of bending and vibration of the disk while it is being played. A first hub for centering a disk having a small center hole is mounted on the disk drive shaft of the drive motor, while a second hub, separate from the first hub, is mounted on the other side of the disk playing position together with a clamper. The second hub has a clamping surface which is brought into contact with the surface of the disk having a small diameter hole when engaged with the disk drive shaft.

7 Claims, 4 Drawing Sheets

DISK CLAMPING DEVICE

BACKGROUND OF THE INVENTION

The present invention relates to an improved disk clamping device for clamping either a disk having a small diameter hole, such as a compact audio disk (CD) which has both a small outside diameter and small center hole size, or a disk having a large hole diameter, such as a video disk (LD), onto the turntable of a disk player so that disks of large and small hole diameters may be played with one disk player.

A conventional disk clamping device for playing both CDs and LDs will be described with reference to FIGS. 1 through 3.

In FIG. 1, reference numeral 6 designates an electric motor. A turntable 2 is fixedly mounted on the output shaft 5 of the motor 6. A centering hub 4, including both a CD hub 4a and LD hub 4b arranged in two stages, is movably mounted on the output shaft 5 with a compression spring 11 interposed between the centering hub 4 and the turntable 2.

A clamper 1 is mounted above the shaft 5 movable vertically. The clamper 1 is used to push a CD 3 or LD 10 against the turntable 2 from above.

Signals recorded on the CD 3 or LD 10 are read with a light beam 9 emitted through an objective lens 8 of an optical pickup 7.

In the disk clamping device, as shown in FIG. 2, the center hole of the CD 3 is engaged with the CD hub 4a of the centering hub 4. Under this condition, the clamper 1 is moved downwardly so that the CD 3 is pushed against the turntable 2 while the compression spring 11 is compressed. Then, the CD 3 is rotated by the motor 6.

In the case of the LD 10, as shown in FIG. 3, its center hole is engaged with the LD hub 4b of the centering hub 4. Similar to the case of the CD 3, the clamper 1 is moved downwardly so that the LD 10 is fixedly held between the clamper 1 and the turntable 2. The LD 10 thus held is rotated by the motor 6.

In FIG. 2, reference character L designates the radius of the innermost signal area on the CD 3.

The maximum outside diameter allowed for the turntable 2 is L−l, where l is the dimension between the center of the light beam 9 and the side of the pickup 7 closest to the shaft 5. For recent pickups, the dimension l is about 22 mm or less.

As is well known, the turntable 2 provides the foundation for clamping a CD 3 or LD 10. Therefore, as the diameter of the turntable 2 is decreased, the amount of vibration and bending of the disk as it is rotated is increased, as a result of which the light beam ultimately cannot be focused on the surface of the disk. When this occurs, the reproduced signals are low in quality; that is, the output picture or sound is of low quality. At the same time, the vibration of the overall disk player is also increased for the same reason, which further lowers the quality of the output signals.

In addition, when a disk is clamped, the clamping error is increased, and the angle of inclination of the CD 3 or LD 10 with respect to the turntable 2 is increased. This difficulty is more significant for the LD 10 which is larger in outside diameter than the CD 3.

SUMMARY OF THE INVENTION

Accordingly, an object of the invention is to eliminate the above-described difficulties accompanying a conventional disk clamping device. More specifically, an object of the invention is to provide a disk clamping device in which the outside diameter of the turntable is increased, and in clamping a CD and an LD, different clamping diameters are employed according to the outside diameters of the disks, whereby vibration and bending of the disk on the turntable are minimized and the signals are reproduced with high quality.

For the purpose of achieving the above-described and other objects, in the disk clamping device of the invention, a disk having a small diameter hole is centered with a first hub mounted on a disk drive shaft and is clamped onto the turntable with a second hub which is moved to engage the disk drive shaft, and a disk having a large diameter hole is centered with the second hub and is clamped onto the turntable with a movable clamper.

DESCRIPTION OF THE PREFERRED EMBODIMENTS

A first preferred embodiment of the invention will be described with reference to FIGS. 4 through 6.

Figure 1:
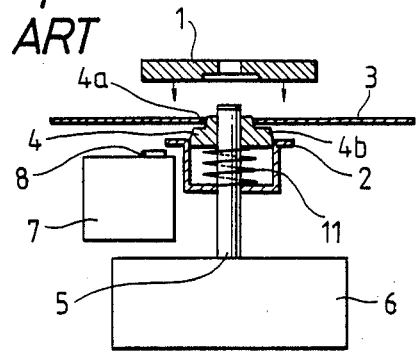
FIG. 1 is a side view of a conventional disk clamping device.
Figure 2:
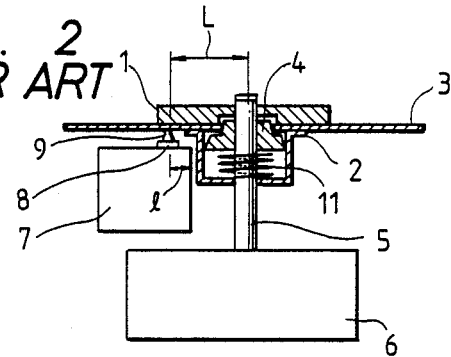
FIG. 2 is a side view of the conventional disk clamping device in the state in which it has clamped a CD.
Figure 3:
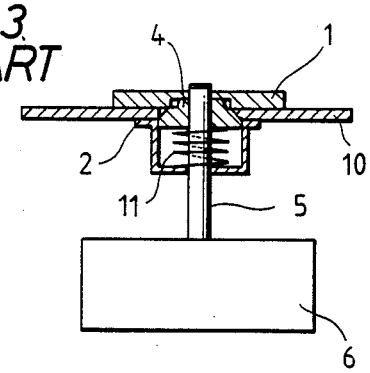
FIG. 3 is a side view of the conventional disk clamping device in the state in which it has clamped an LD.
Figure 4:
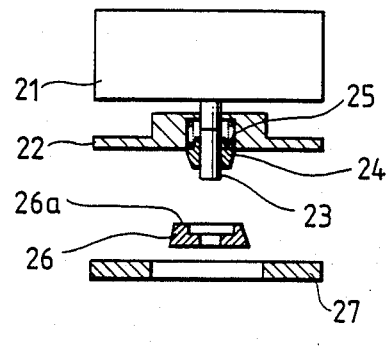
FIG. 4 is a side view showing a first example of a disk clamping device constructed according to the invention in the state in which it has not yet clamped a disk.
Figure 5:
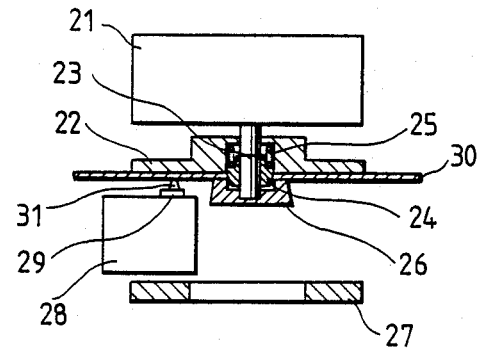
FIG. 5 is a side view of the disk clamping device of FIG. 4 in the state in which it has clamped a CD.

In FIG. 4, reference numeral 21 designates an electric motor. A turntable 22 is fixedly mounted on the output shaft 23 of the motor 21. A first hub 24, which is engaged with the center hole of a CD 30, is movably mounted on the output shaft 23 with a compression spring 25 interposed between the turntable 22 and the first hub 24.

A second hub 26, which is engageable with the center hole of an LD 32, is detachably mounted on the output shaft 23 so that the CD 30 is fixedly held between the turntable and one surface of 26a of the second hub 26.

A clamper 27 is moved towards the turntable 22 so that the LD 32 is fixedly pushed against the turntable 22.

In the disk clamping device thus constructed, a sensor (not shown) detects whether a CD 30 is loaded into the disk player or an LD 32. When a CD 30 is detected, only the second hub 26 is moved upwardly.

As the second hub 26 is moved upwardly, the CD 30 is moved upwardly so that its center hole is engaged with the first hub 24; that is, the CD 30 i centered.

The second hub 26 is further moved upwardly. Therefore, with the CD 30 centered, the first hub 24 is moved upwardly together with the CD 30 while compressing the spring 25. As a result, as shown in FIG. 5, the CD 30 is fixedly held between the surface 26a of the second hub 26 and the turntable 22.

Figure 6:
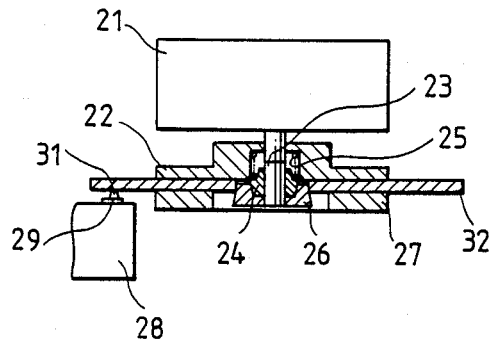
FIG. 6 is a side view of the disk clamping device of FIG. 4 in the state in which it has clamped an LD.

When, on the other hand, an LD 32 is detected by the sensor, as shown in FIG. 6, first the second hub 26 is lifted so that it is inserted into the center hole of the LD 32 to center the latter. At the same time, the clamper 27 is also lifted to move upwardly the LD 32, which has been centered by the second hub 26, so that the LD 32 is clamped onto the turntable 22.

In this operation, the first hub 24 is pushed by the second hub 26, thus being retracted while compressing the spring 25.

After the CD 30 or LD 32 has been clamped in the above-described manner, the disk is rotated and signals recorded on the disk are read with a light beam 31 emitted through an objective lens 29 of a pickup 28.

In the case of the above-described disk clamping device, the turntable 22 is provided above the disk and the pickup 28 is provided below the disk. Therefore, the outside diameter of the turntable 22, being not limited by the signal reading operation of the pickup 28, can be large.

Thus, in the above-described disk clamping device, the CD 30 is clamped onto the large-diameter turntable 22 with the second hub 26 of small diameter, while the LD 32 is clamped onto the large-diameter turntable 22 with the clamper 27 of large diameter.

The same effect can be obtained by modifying the above-described disk clamping device in such a manner that the turntable is provided below the disk and the pickup is mounted above the disk.

A second embodiment of the invention will be described with reference to FIGS. 7 through 9.

Figure 7:
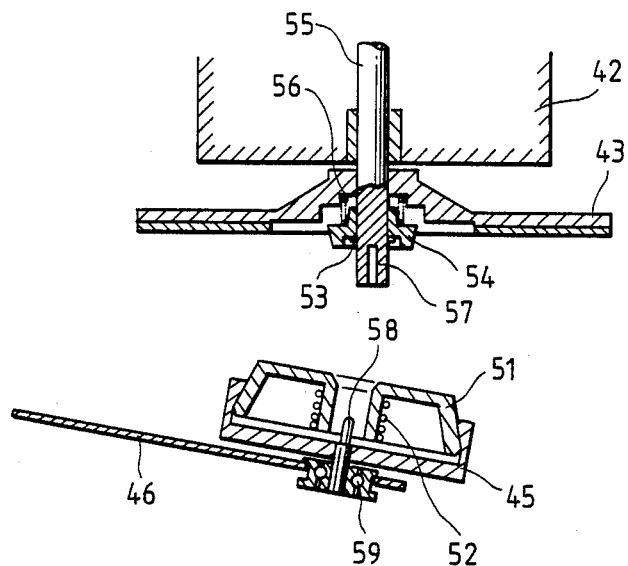
FIG. 7 is a side view showing a second example of a disk clamping device constructed according to the invention in the state in which it has not yet clamped a disk.
Figure 8:
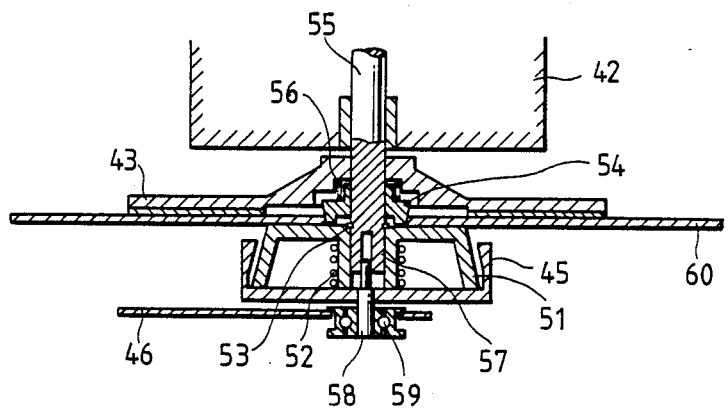
FIG. 8 is a side view of the disk clamping device of FIG. 7 in the state in which it has clamped a CD.

As shown in FIG. 7, a first hub 54 is slidably mounted on the output shaft of an electric motor 42, and a compression spring 56 is interposed between the first hub 54 and a turntable 43. An E-ring 53 is provided to retain the first hub 54 on the output shaft 55.

A second hub 51 is coaxially accommodated in a clamper 45. A compression spring 52 is interposed between the clamper 45 and the second hub 51.

The clamper 45 is rotatably supported by a clamper holder 46. More specifically, the clamper 45 is mounted on a pin 58 which is secured through a bearing 59 to the clamper holder 46. When the clamper holder 46 is swung to cause the clamper 45 to approach the turntable 43, the end portion of the pin 58 is inserted into the center hole 57 formed in the end portion of the output shaft 55 so that the pin 58 and the shaft 55, being coaxial with each other, can rotate as a single unit.

In the second embodiment, similar to the first embodiment, when a CD 60 or LD 44 is loaded in the disk player, a sensor detects which type of disk has been loaded. Otherwise, this determination can be achieved with a manual instruction device.

Figure 9:
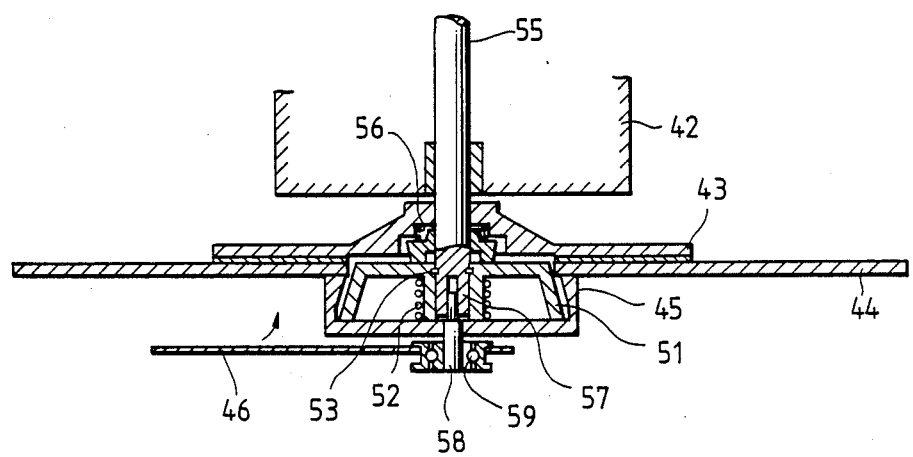
FIG. 9 is a side view of the disk clamping device of FIG. 7 in the state in which it has clamped an LD.

When an LD 44 is loaded in the disk player, as shown in FIG. 9, the second hub 51 is inserted into the center hole of the LD 44; that is, the LD 44 is centered, and then the end portion of the pin 58 is inserted into the center hole 57 of the output shaft 55 of the motor 42 so that the LD 44 is clamped onto the turntable 43 with the clamper 45.

In this operation, the second hub 51 abuts the first hub 54 with the LD 44 centered, and the first hub 54 and the second hub 51 compress the springs 56 and 52, respectively.

Under this condition, the motor 42 is rotated. Therefore, the turntable 43, the first hub 54, the second hub 51 and the clamper 45 are rotated, and accordingly the LD 44 is also rotated, whereby the signals recorded on the LD 44 are reproduced with a pickup (not shown) provided below the LD 44.

When a CD 60 is detected, similarly the clamper holder 46 is swung towards the turntable 43. As a result, the CD 60 is placed on the second hub 51 and lifted and, as shown in FIG. 8, the center hole of the CD 60 is engaged with the first hub 54; that is, the CD 60 is centered. Then, the CD 60 is clamped to the turntable 43 with the second hub 51. The CD 60 thus centered is rotated by the motor 42 so that the signals recorded on it can be reproduced with the pickup provided below the disk.

As is apparent from the above description, according to the invention, the turntable and the pickup are provided on opposite sides of a disk, and therefore the outside diameter of the turntable can be increased irrespective of the radius of the innermost signal recording area of the disk having a small diameter hole.

With the disk clamping device of the invention, the disk having a small diameter hole can be clamped to the turntable with the same hub used for centering the disk having a hole of large diameter, and the disk having a large diameter hole can be clamped to the turntable with the clamper larger in diameter than the hub.

That is, in clamping a CD and LD to the turntable, different clamping diameters are employed according to the outside diameters of the disks. This minimizes the displacement of the pickup from the focal point which would otherwise be caused by the vibration or bending of the disk clamped onto the turntable.

That is, the invention eliminates the above-described difficulty accompanying a conventional disk player for playing back both CDs and LDs that the reproduced picture or sound is low in quality because of vibration or bending of the disk set on the turntable.

An LD is constructed using two layers, and therefore in general the center hole on one side tends to be shifted slightly from that on the other side. However, with the invention, because CDs are centered in one direction while LDs are centered in the opposite direction, the CD centering operation and the LD centering operation will not interfere with each other.

Furthermore, the disk clamping device of the invention clamps a disk while centering it with less eccentricity in the signal recording surface.

What is claimed is:
1. A disk clamping device, comprising:
   a turntable mounted fixedly on a disk drive shaft of a motor;
   a first hub for centering a disk having a small diameter hole, said first hub being mounted on said disk drive shaft;
   a second hub for centering a disk having a large diameter hole, said second hub being separated from said first hub and movably mounted to engage said disk drive shaft and having a clamping surface which is brought into contact with a surface of said disk having a small diameter hole when engaged with said disk drive shaft; and
   a separate clamper movably mounted so as to be brought into contact with a surface of said disk having said large diameter hole, wherein when said clamping surface of said second hub is brought into contact with said surface of said disk having a small diameter hole, said clamper is positioned away from said surface of said disk having a small diameter hole.

2. The disk clamping device of claim 1, wherein said second hub and said clamper are positioned on a side of a disk mounted on said turntable opposite said first hub.

3. The disk clamping device of claim 2, wherein said first hub is slidably received within a recess in said turntable, and further comprising first spring means for urging said first hub outwardly from said recess.

4. The disk clamping device of claim 3, wherein said second hub is receivable within a recess provided in said clamper.

5. The disk clamping device of claim 4, further comprising: a clamper holder for moving said second hub and said clamper between a retracted position and a position engaging a disk placed on said turntable; bearing means for mounting said second hub and said clamper on said clamper holder; a pin protruding from said bearing means and receivable within a hole formed in an end portion of said drive shaft when said second hub and said clamper are in said position engaging a disk placed on said turntable; and second spring means for urging said second hub outwardly from said recess provided in said clamper.

6. The disk clamping device of claim 1, wherein said turntable is provided on one side of a corresponding disk and a pickup for reading signals recorded on said disk and said clamper are provided on the other side of said disk.

7. The disk clamping device of claim 6, wherein an outside diameter of said turntable is not limited by the signal reading operation of said pickup.

* * * * *